J. J. SWEENEY.
PULLEY AND DRIVING BELT GUARD.
APPLICATION FILED JULY 28, 1914.
1,145,715.
Patented July 6, 1915.
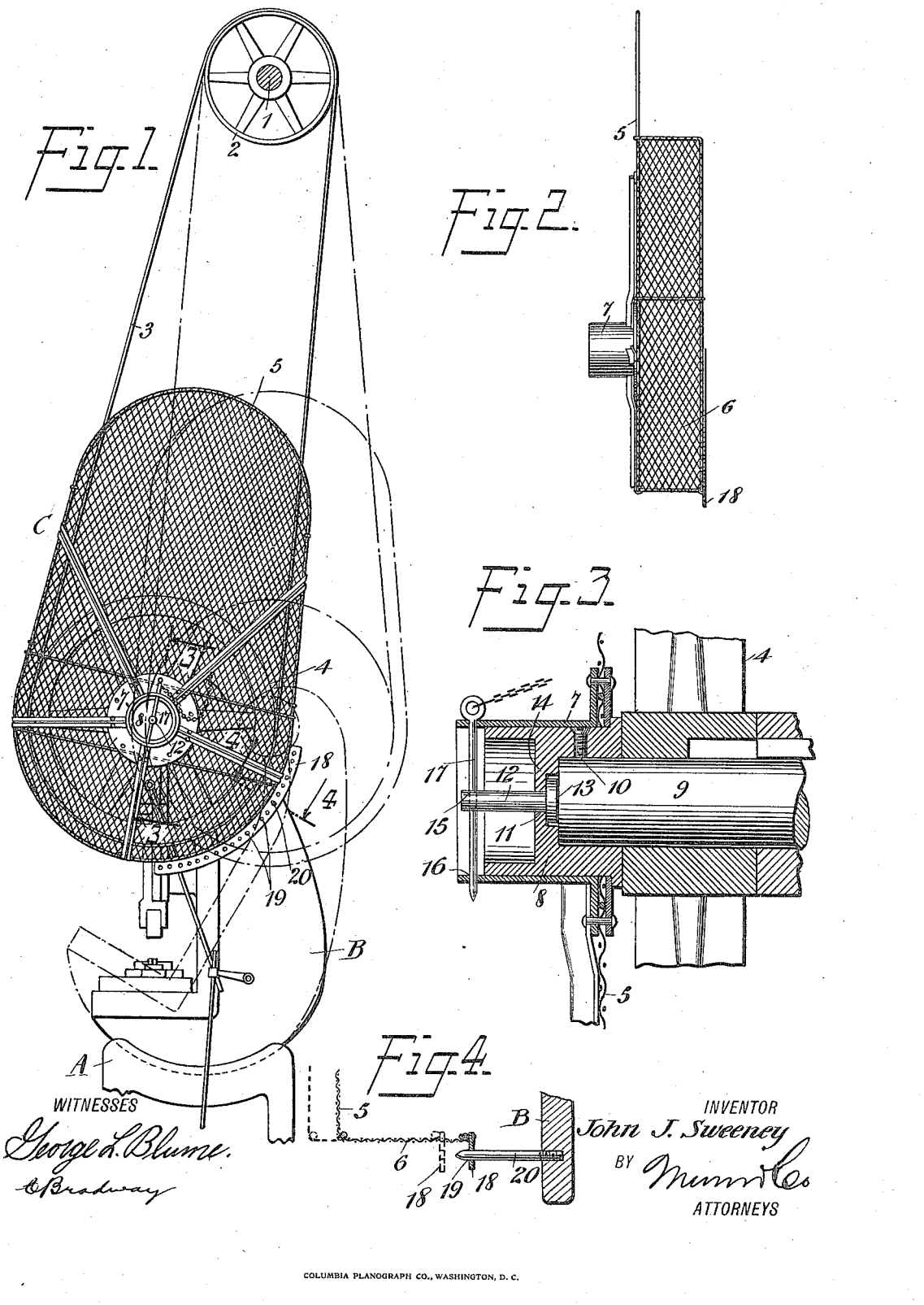
INVENTOR
John J. Sweeney
BY
ATTORNEYS

UNITED STATES PATENT OFFICE.

JOHN J. SWEENEY, OF NEW YORK, N. Y.

PULLEY AND DRIVING-BELT GUARD.

1,145,715.     Specification of Letters Patent.     Patented July 6, 1915.

Application filed July 28, 1914. Serial No. 853,652.

*To all whom it may concern:*

Be it known that I, JOHN J. SWEENEY, a citizen of the United States, and a resident of the city of New York, borough of Manhattan, in the county and State of New York, have invented a new and Improved Pulley and Driving-Belt Guard, of which the following is a full, clear, and exact description.

This invention relates to guards for pulley and belt driving means for power presses and the like, wherein the power is obtained from an overhead shaft and the machine is adjustable with respect to such overhead shaft.

The general objects of the present invention are to provide a simple, effective and novel belt and pulley guard for power presses and the like, whereby the pulley and belt will be effectively inclosed to prevent injury to the workmen, the guard being so designed as to be comparatively simple and inexpensive to manufacture, easily and quickly adjusted and occupying a comparatively small space.

A specific object of the invention is the provision of novel means for enabling the guard to be easily and quickly adjusted so as to always be in alinement with the belt when the power press or other machine to which the guard is applied, is adjusted with respect to the overhead power shaft.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention, and wherein similar characters of reference indicate corresponding parts in all the views, Figure 1 is a side view of a portion of a power press with the guard in position thereon, the press being shown in two operative positions by full and broken lines respectively; Fig. 2 is an edge view of the guard; Fig. 3 is an enlarged sectional view on the line 3—3, Fig. 1; and Fig. 4 is an enlarged sectional view on the line 4—4, Fig. 1.

Referring to the drawing, A designates the base of the power press, and B the body thereof which is adjustable to different positions, as shown by the full and broken lines in Fig. 1, and directly over the power press is a driving shaft 1 that has a pulley 2 around which passes a belt 3, the same extending downwardly from the driving shaft 1 to a large driving wheel 4 on the power press. The wheel 4 moves horizontally with the body B of the press as the latter is adjusted, and consequently the belt 3 automatically shifts with respect to the driving shaft 1 when the body of the press is adjusted.

The guard C is so designed that it can be readily adapted for the adjustment mentioned. This guard comprises preferably a wire body or case so that it will not interfere with the passage of light and cause shadows to be cast on the work. The guard comprises a flat side 5 and a rim 6, the width of the side 5 being slightly greater than the diameter of the pulley 4, and the length is such that the belt will be guarded to a suitable height, say seven feet from the floor. The side 5 of the guard has a hub 7 suitably fastened thereto and arranged in concentric relation to the lower part of the guard. This hub is mounted on a collar 8 or equivalent means carried by or connected with the crank shaft 9 of the power press. In the present instance the collar is shown connected with the shaft by a set-screw 10. This collar has a central opening 11 through which projects a pin 12 that has at its inner end a head 13 which is confined between the wall 14 of the collar and the end of the shaft 9. This pin or spindle 12 has an opening 15 which alines with openings 16 in the hub 7 of the guard, and a locking pin 17 passes through the openings 15 and 16, so as to lock the hub in place. By this arrangement it will be understood that the collar 8 rotates with the shaft 9, but the guard remains stationary, since the pin 12 is not driven with the shaft or collar. To hold the guard in different positions of adjustment so that the sides of the guard will always be parallel with the belt when the body B of the press is adjusted to different positions, the guard has an arcuate strip of metal 18 fastened thereto adjacent its bottom at one side, and this strip has spaced openings 19 so that in one of these openings a stud or fixed stop 20 fastened to the power press will engage, as shown in Fig. 4. In order to adjust the guard the locking pin 17 is taken out and the guard pulled laterally from the power press far enough to disengage the apertured strip 18 from the stud 20, and while the guard is still supported by its hub 7 on the collar 8 it is swung around so as to be parallel with the belt 3 in the new position of adjustment of the body of the press. The guard is then moved laterally toward the press so as to engage the stud 20 in the aperture 19 that is in alinement with the stud, and after this position is attained the locking pin 17 is replaced. It will thus be seen that the placing, removal or adjustment of the guard can be easily accomplished.

From the foregoing description taken in connection with the accompanying drawing, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A guard of the class described comprising a body adapted to inclose moving parts, a hub on the body, and a device having a line of apertures concentric with and spaced from the hub.

2. A machine including a body, a pulley, a shaft for the pulley, and a belt passing around the pulley, with a guard covering the belt and pulley at the side opposite from the said body, a support attached to the shaft and on which the guard is mounted, said guard being adjustable about an axis of the said shaft, and interengaging means between the said body and guard for holding the latter in any desired position of adjustment.

3. The combination of a machine including a body, a shaft, a pulley thereon, and a belt engaging the pulley, with a guard covering the belt and pulley at the side opposite from the said body and including a hub, a supporting piece fastened to the shaft and disposed in the hub for supporting the guard, said guard being adjustable about an axis of the said shaft, and interlocking means between the said body and guard for holding the guard in any desired position of adjustment.

4. The combination of a machine including a body, a shaft, a pulley thereon, and a belt engaging the pulley, with a guard covering the belt and pulley at the side opposite from the said body and including a hub, a supporting piece fastened to and alining with the shaft and disposed in the hub for supporting the guard, a stud on the said body, and means arranged on the guard and concentric with the hub for interlocking with the stud to hold the guard in place.

5. The combination of a machine including a body, a shaft, a pulley thereon, and a belt engaging the pulley, with a guard for the belt and pulley and including a hub, a supporting piece fastened to the shaft and disposed in the hub for supporting the guard, a stud on the said body, means arranged on the guard and concentric with the hub for interlocking with the stud to hold the guard in place, a non-rotatable element mounted in the said supporting piece, and a locking pin engaged with the hub and said element for retaining the guard against axial displacement on the supporting piece.

6. The combination of a rotary shaft, a pulley thereon, a belt passing around the pulley, a guard for the belt and pulley, a hub on the guard, a collar fastened to the shaft and extending into the hub, an axially-disposed swiveled element in the collar, a removable locking pin fastened through the hub and element, and a stationary device with which the guard engages for preventing turning of the guard around the collar as a center.

7. The combination of a driving pulley, a machine including a driven pulley and shiftable with respect to the driving pulley, a belt passing around the pulleys, a guard for the belt and the driven pulley, a support disposed co-axially with the driven pulley and supporting the guard, and interengaging means between the guard and machine for adjusting the position of the guard with the adjustment of the position of the driven pulley.

In testimony whereof I have signed my name to this specification in the presence of two subscribing witnesses.

JOHN J. SWEENEY.

Witnesses:
CHATTEN BRADWAY,
PHILIP P. ROLLHAUS.

Copies of this patent may be obtained for five cents each, by addressing the "Commissioner of Patents, Washington, D. C."